United States Patent Office 2,726,153
Patented Dec. 6, 1955

2,726,153
WELDING ROD

Carl Ballhausen, Krefeld, Germany, assignor to Deutsche Edelstahlwerke Aktiengesellschaft, Krefeld, Germany No Drawing. Application September 15, 1952,
Serial No. 309,732

Claims priority, application Germany September 18, 1951

2 Claims. (Cl. 75—203)

The invention relates to a welding rod, which is used for welding-on hard metal, whether by an electric arc or oxygen flame. By hard metal for the purpose of the invention are understood fused or sintered hard substances composed of one or more of the carbides of the metals tungsten, molybdenum, vanadium, titanium, tantalum, columbium, and a relatively low-melting point auxiliary phase bonding the carbide material. The auxiliary phase consists of one or more metals of the iron group, and if desired additional constituents such as silicides, borides and the like.

For application to the surfaces of the workpieces, the hard metal is comminuted and welded on to the workpiece surface, a supplementary welding material being employed. This method is comparatively complicated and it has therefore been proposed to pour such comminuted, e. g., granulated or powdered, hard metal into an iron tube and to employ this iron tube as a welding rod or electrode. The fused iron of the iron tube forms on the surface of the workpiece a layer which holds the grains or pieces of hard metal after solidification. The hard metal has been either introduced in the loose state into the tubes or sintered into the latter, but in either case it was exclusively hard metal which was present in the tube. The iron of the tube thus acts alone as a low-melting component and, in the applied layer, as the binder for the separate pieces or particles of hard metal. It has been proposed to introduce small quantities of alloying elements, such as chromium, manganese and silicon, into the tube for the purpose of improving the welding properties. In this case, however, the fusion temperatures are so high that a part of the hard metal, especially when it is finely ground, is dissolved in the weld.

According to the invention, on the contrary, the welding rod includes, in addition to the hard metal, an alloy which fuses at low temperature. This alloy consists of 5–30% chromium boride, the remainder substantially all iron, nickel or cobalt, singly or severally.

According to the selected composition of the alloy, the alloy has a melting point at temperatures from 1000 to 1300° C., and has the property of constituting not only a particularly suitable bonding agent for the hard metal, but also of exhibiting in itself desirable wear resisting properties, so that the risk of rapid wearing away of the layer of bonding agent and detachment of the hard metal is reduced. When welding by an arc or a flame, the alloy becomes liquid because of its low melting point. The solidifying molten mass adheres firmly to the work, for example, of iron or steel, and thereby encloses the parts of hard metal which are not released from the fused mass.

The welding rod can be so produced that it is fused into rod form from hard metal in granular or powdered form and the low-melting alloy. It is however also possible to sinter the granular or powdered hard metal together with the alloy into rod form. In both cases, it is expedient to start from a powdered mixture of the low-melting alloy in which the granular or powdered hard metal is uniformly distributed. The complete mixture is then either melted down to shape or sintered to form a shaped member after a previous pressing operation.

Alternatively a metal, preferably iron, tube as heretofore referred to may be used. The mixture of low-melting alloy powder and the hard metal powder or the pieces of hard metal can be introduced loosely into this tube, whereupon the tube is closed at both ends and can be used for welding. In the immediate vicinity of the end with which welding is carried out, the mass sinters or fuses together, so that the powder does not escape from the tube, but in order further to ensure that the powder does not escape from the tube during welding, the hard metal and the low-melting alloy can be sintered in the tube, even bound therein by fusion. Since the tube consisting of a metal of the iron group, usually iron, contributes to the formation of the fused mass during the welding process, the metals of the iron group in the alloys can be provided in a correspondingly smaller quantity.

What I claim is:

1. Welding rod comprising hard metal composed of at least one carbide selected from the group of tungsten, molybdenum, vanadium, titanium, tantalum and columbium carbides and an auxiliary bonding phase of at least one metal of the iron group and comprising in addition to said hard metal a low-melting point alloy consisting of from 5 to 30% chromium boride and the remainder substantially constituted by at least one metal of the group iron, nickel and cobalt.

2. Welding rod comprising hard metal comprising at least one hard carbide selected from the group of tungsten, molybdenum, vanadium, titanium, tantalum and columbium carbides and a metal bonding medium essentially comprising at least one metal of the iron group and comprising in addition to said hard metal a low-melting point alloy consisting of from 5 to 30% chromium boride and the remainder substantially constituted by at least one metal of the group iron, nickel and cobalt, the hard metal being in discrete form with the particles or pieces distributed through the said alloy material and a coherent mass of rod form having been produced by heat.

References Cited in the file of this patent

UNITED STATES PATENTS

| Number | Name | Date |
|---|---|---|
| 1,757,601 | Stoody et al. | May 6, 1930 |
| 1,825,829 | Stoody et al. | Oct. 6, 1931 |
| 1,913,373 | De Galyer | June 13, 1933 |
| 1,977,128 | Hawkins | Oct. 16, 1934 |
| 1,999,888 | Ammann | Apr. 30, 1935 |
| 2,002,462 | Woods | May 21, 1935 |
| 2,204,412 | Hinnuber | June 11, 1940 |
| 2,219,462 | Wissler | Oct. 29, 1940 |